United States Patent
Bessios

(10) Patent No.: US 7,187,873 B2
(45) Date of Patent: **\*Mar. 6, 2007**

(54) COMPENSATION OF POLARIZATION MODE DISPERSION IN SINGLE MODE FIBER FOR MAXIMUM-LIKELIHOOD SEQUENCE ESTIMATION

(75) Inventor: Anthony Bessios, Fremont, CA (US)

(73) Assignee: Agere Systems Inc., Allentown, PA (US)

(\*) Notice: Subject to any disclaimer, the term of this patent is extended or adjusted under 35 U.S.C. 154(b) by 0 days.

This patent is subject to a terminal disclaimer.

(21) Appl. No.: 11/378,900

(22) Filed: Mar. 17, 2006

(65) Prior Publication Data
US 2006/0153576 A1 Jul. 13, 2006

Related U.S. Application Data

(63) Continuation of application No. 10/035,928, filed on Dec. 26, 2001, now Pat. No. 7,110,683.

(60) Provisional application No. 60/280,326, filed on Mar. 30, 2001.

(51) Int. Cl.
*H04B 10/06* (2006.01)

(52) U.S. Cl. .............. 398/208; 398/149; 398/159
(58) Field of Classification Search ............ 398/147, 398/149, 158, 159, 208, 209, 210, 211
See application file for complete search history.

(56) References Cited

U.S. PATENT DOCUMENTS

| 5,191,462 | A |   | 3/1993 | Gitlin et al. ............ 398/209 |
| 5,561,647 | A | * | 10/1996 | Kayanuma .............. 369/47.27 |
| 6,016,379 | A | * | 1/2000 | Bulow ..................... 385/147 |
| 6,751,255 | B1 |  | 6/2004 | Reuven et al. ............ 375/233 |
| 6,798,832 | B1 |  | 9/2004 | Nakata et al. ............. 375/233 |

\* cited by examiner

*Primary Examiner*—Christina Leung

(57) ABSTRACT

An output signal of a single mode fiber (SMF) is spectrally shaped to achieve characteristics of a predefined channel "target" response. The target response is that of a partial-response, maximum-likelihood channel with additive white Gaussian noise. A receiver employs a maximum-likelihood sequence estimation (MLSE) detector having its detection algorithm, such as a Viterbi algorithm (VA), matched to the target response. Thus, state, branch, and path metric calculations for a Viterbi trellis may be optimized for a channel having this target response.

14 Claims, 3 Drawing Sheets

COMPENSATION OF POLARIZATION MODE DISPERSION IN SINGLE MODE FIBER FOR MAXIMUM-LIKELIHOOD SEQUENCE ESTIMATION

CROSS-REFERENCE TO RELATED APPLICATIONS

This is a continuation of application Ser. No. 10/035,928, filed on Dec. 26, 2001, now issued as U.S. Pat. No. 7,110,683, the teachings of which are incorporated herein by reference, which claims the benefit of the filing date of U.S. provisional application No. 60/280,326, filed on Mar. 30, 2001.

BACKGROUND OF THE INVENTION

1. Field of the Invention

The present invention relates to detection of data in a communications system, and, more particularly, to compensation for signal dispersion in an optical fiber.

2. Description of the Related Art

In many digital communications systems, a user generates digital information that is then processed into an encoded (e.g., error-correction encoded) and/or packetized stream of data. The stream of data is then divided into discrete blocks. Each of the blocks may be mapped onto a corresponding one of a sequence of code or symbol values ("symbols") chosen from a pre-defined alphabet A, and generated with a period $T_s$, sometimes referred to as the "baud" rate. For optical transmission of the digital information, an optical carrier operating with a wavelength of, for example, 1310 nm or 1550 nm, is modulated with the encoded stream of data. The modulated optical carrier is then passed through an optical fiber, such as a single mode fiber (SMF) having its lowest order bound propagating at 1310 nm or 1550 nm.

The modulated optical signal transmitted through the optical fiber channel comprises a series of light pulses. Since a transmission medium may be modeled as a filter having a corresponding (frequency-domain) transfer function and (time-domain) impulse response, the pulse transmitted through the channel may have its shape modified based on this transfer function. The analog pulse shape may be modified in amplitude and phase, and also experience dispersion of the pulse. Consequently, the time duration of the pulse transmitted through a medium may extend over a period of time greater than the time duration of a particular symbol. Adjacent pulses transmitted through the medium may thus corrupt each other, which corruption is known as inter-symbol interference (ISI). This characteristic of the optical fiber (channel) is termed memory (e.g., if one adjacent pulse contributes to ISI, the memory "length" is one).

As bit rates in optical communication systems increase for high speed data transmission, such as rates above 10 Gbps, receivers are increasingly faced with mitigation of effects of pulse dispersion and ISI to the optical signal passing through the optical fiber channel. A receiver typically includes a detector forming decisions for received, sampled channel output data ("receive signal") corresponding to the transmitted pulses. These detectors may apply compensation/equalization to the receive signal, and employ algorithms such as maximum-likelihood sequence detection to reconstruct the sequence of pulses in the transmitted, encoded stream of data.

For optical communication systems, there are several sources of pulse dispersion through an SMF. One source of dispersion is chromatic dispersion that causes time-domain pulse broadening due to the different traveling velocities of each of the optical pulse's spectral components. Prior art methods of compensation for chromatic dispersion use an opposite dispersion-compensating fiber (DCF) that has a greater dispersion parameter, usually by a factor of 10.

Another source of dispersion is polarization mode dispersion (PMD) that arises from imperfections in the circular symmetry of the fiber core. The imperfections typically are caused by manufacturing imperfections in the core, chemical impurities, and excessive bending or strain during installation. Imperfect circular symmetry results in birefringent SMF that causes two orthogonal principal polarization states (PPS) to propagate with different velocity through the fiber core. The resulting average differential group delay (DGD) is proportional to the square-root of the transmission distance. For example, an SMF having PMD of 10 ps/√L, where L is the distance in kilometers, has a DGD of 100 ps at a distance of 100 km. A distances greater than 100 km and bit rates of greater than 10 Gbps, the DGD becomes significant when compared to the symbol period ($T_s$=100 ps at 10 Gbps). For a 10 Gbps transmission data rate, the magnitude of the maximum allowable value for the mean DGD $\langle \tau_d \rangle$ between two orthogonal PPSs has an upper bound of 100 ps (i.e., $\langle \tau_d \rangle \leq 100$ ps). The (SMF) channel may be modeled as a two-symbol dispersive channel with impulse response h(t), and the model for a 10 Gbps channel that reflects statistical differential delay between the two PPS components may be as given in equation (1):

$$h(t)=\sqrt{\alpha}(\delta(t-\tau_d))+\sqrt{1-\alpha}(\delta(t)) \qquad (1)$$

with $\delta(\cdot)$ defined as the delta function, $(\alpha/(1-\alpha))$ defined as the power distribution ratio among the two orthogonal PPSs with $0<\alpha<1$, and where $\tau_d$ follows a Maxwell distribution as given in equation (2):

$$P_{\langle \tau_d \rangle}(\tau_d) = \frac{32\tau_d^2}{\pi^2 \langle \tau_d \rangle^3} \exp\left(-\frac{4\tau_d^2}{\pi \langle \tau_d \rangle^2}\right) \quad 0 < \tau_d < \infty \qquad (2)$$

ISI results in multi-level channel output values due to the effect of the channel's memory on the binary input levels, causing degradation of a receiver's bit error rate (BER) performance. Linear ISI and time-varying PMD effects are generally compensated for using adaptive equalization.

SUMMARY OF THE INVENTION

The present invention relates to spectrally shaping an output signal of a single mode fiber (SMF) to achieve characteristics of a predefined channel "target" response. The target response is that of a partial-response channel with additive white Gaussian noise. A receiver may then employ a maximum-likelihood sequence estimation (MLSE) detector having its detection algorithm, such as a Viterbi algorithm (VA), matched to the target response. Thus, state, branch, and path metric calculations for a Viterbi trellis may be optimized for a channel having this target response.

In accordance with one embodiment of the present invention, compensation is applied to samples received from an optical channel by spectrally shaping, with an equalizer, the samples for compensation to generate a sequence of equalized samples. An error is generated for a current sample based on the difference between 1) an equalized current sample and 2) a decision for the current sample adjusted for a target response, wherein the target response is based on a response of the optical channel. The error is combined with one or more samples to provide an update signal; and the equalizer is updated with the update signal to adjust the equalizer response to the target response.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In accordance with exemplary embodiments of the present invention, an output signal of a single mode fiber (SMF) is spectrally shaped to achieve characteristics of a predefined channel ("target") response. The target response is that of a partial-response channel with additive white Gaussian noise (AWGN) (e.g., controlled inter-symbol intereference (ISI) is introduced). A receiver employs a maximum-likelihood sequence estimation (MLSE) detector having its detection algorithm, such as a Viterbi algorithm (VA), matched to the target response. Thus, state, branch, and path metric calculations for a Viterbi trellis may be optimized for a channel having this target response. A receiver employing one or more embodiments of the present invention may provide improved bit error rate (BER) performance for detecting and receiving data from a carrier-modulated wavelength from a SMF.

Figure 1:
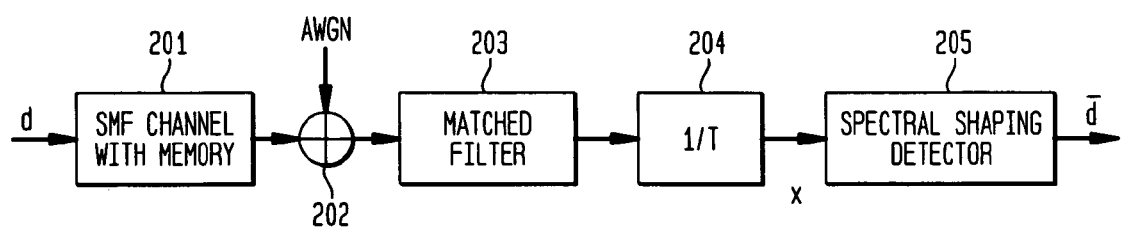
FIG. 1 shows a block diagram of a transmission system including a spectral-shaping detector operating in accordance with an exemplary embodiment of the present invention.

FIG. 1 shows a block diagram of a transmission system including a spectral-shaping detector 205 operating in accordance with an exemplary embodiment of the present invention. Data d is transmitted through the channel comprising SMF 201 to which white, Gaussian noise is added, as shown conceptually as being added to the signal by adder 202. The signal from the channel is applied to matched filter 203 to reconstruct the transmitted pulses including the channel effects. The output of matched filter 203 is digitized into input samples with sampling frequency 1/T. The input samples are then applied to spectral-shaping MLSE detector 205 operating in accordance with an exemplary embodiment of the present invention.

As described herein, an SMF with data transmission operating at 10-Gbps with $\langle \tau_d \rangle \leq 100$ ps is characterized by a partial response with memory length one. Data generated for differential group delays of 70 ps and 100 ps and a given sampling phase may typically be transformed by the channel into data dominated by ISI of the type a+bD where a=1, b~0.3. From equation (1), the SMF channel response H(D) has the form of a+bD, where D is the delay operator (the channel dispersion length is two symbols).

Thus, data may be recovered from input samples from an SMF channel response H(D) of memory length one using a 2-state VA algorithm. The 2-state Viterbi detector is sufficient to de-convolve the ISI for optimum sequence estimation in the presence of AWGN. SNR loss from ISI ($SNR_{loss}^{ISI}$) may be completely recovered by MLSE detection via a 2-state VA algorithm given normalized minimum (Euclidean) distance $\delta_{min}$ for a dispersive channel (memory length 1), as in equation (3):

$$\partial_{min}^2 = 1 \Rightarrow SNR_{loss}^{ISI} = 10 \log_{10}(\partial_{min}^2) = 0 \qquad (3)$$

The present invention is not limited to these data transmission rates, memory lengths, and SMF channel response forms. In addition, more complex forms of target response may be selected.

Figure 2:
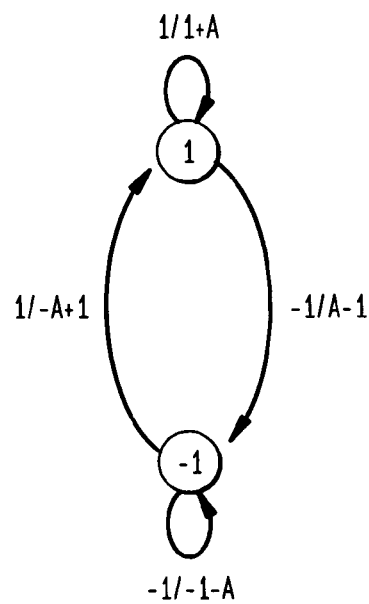
FIG. 2 shows an exemplary 2-state transition diagram for the 2-state VA algorithm with branch metrics based on the parameter A for transitions.

For the preferred embodiments, the target response T(D) is selected as A+D, where A is a parameter that for some embodiments may be fixed. However, preferred embodiments of the present invention adaptively select A based on input samples over time, where A may vary between 0 and 1. The parameter A is incorporated into the branch metric of the two state VA algorithm. FIG. 2 shows an exemplary 2-state transition diagram for the 2-state VA algorithm with branch metrics based on the parameter A for transitions. As shown in FIG. 2, the two symbol states are "1" and "−1". The branch metric for staying in state "1" is 1/(1+A) and for transitioning to state "−1" is −1/(A−1). The branch metric for staying in state "−1" is −1/(−1−A) and for transitioning to state "1" is 1/(1−A).

Figure 3:
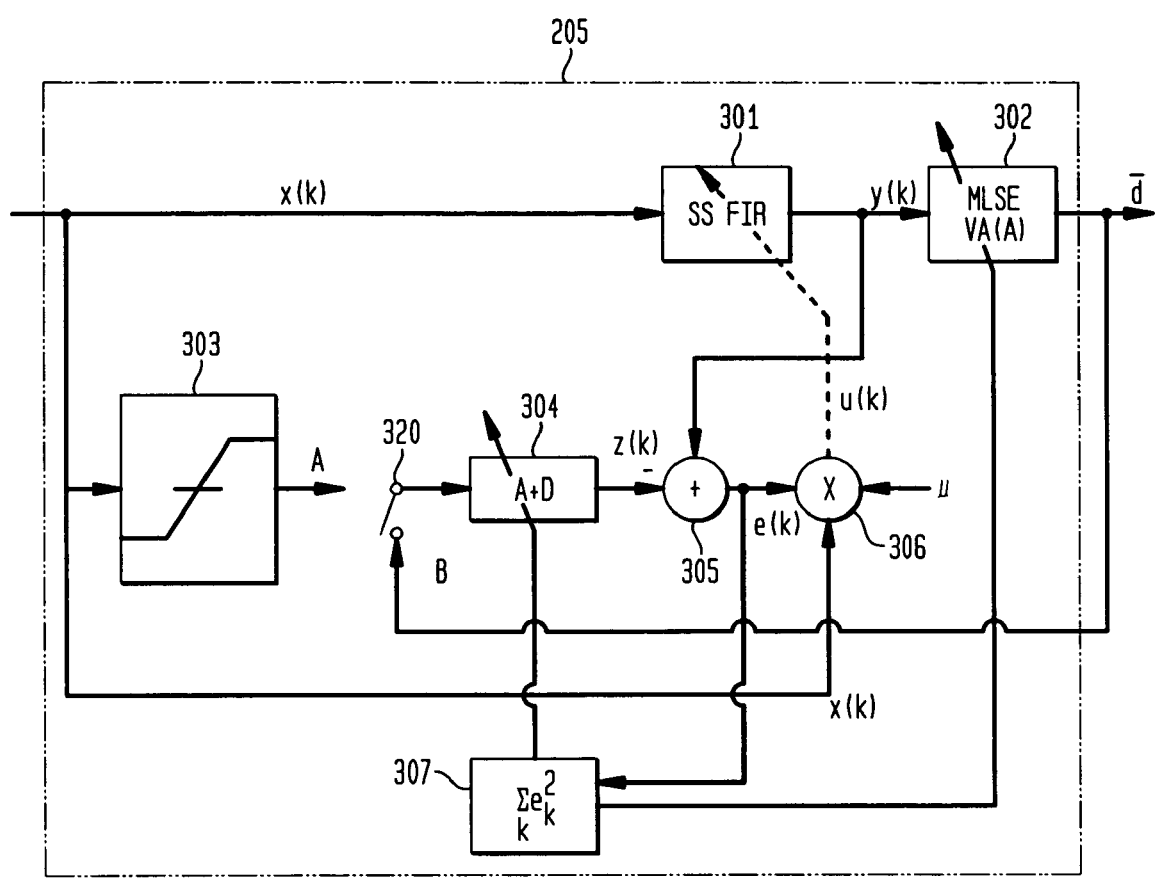
FIG. 3 shows a block diagram of the spectral-shaping detector of FIG. 2.

FIG. 3 shows a block diagram of the spectral-shaping, MLSE (SS-MLSE) detector 205 of FIG. 2. SS-MLSE detector 205 comprises SS finite impulse response (SS-FIR) filter 301, MLSE detector 302, threshold detector 303, response filter 304, combiner 305, multiplier 306, and squared-error accumulator 307.

In a first path, input sample $x_k$ at time k is applied to SS-FIR filter 301. As employed herein, the terms x(k) and $x_k$ are equivalent notation for the sample at time k. SS-FIR filter 301 applies equalization to the sample $x_k$ to generate the output value $y_k$. Equalization of SS-FIR filter 301 adjusts the input samples to correspond to samples passing through a channel with the target response A+D. Filter taps of SS-FIR filter 301 are set based on an update signal $u_k$ generated by multiplier 306 in the second path, as described subsequently. The output $y_k$ of SS-FIR filter 301 at time k may be given as in equation (4):

$$y_k(c_k^{(l)}) = \sum_l c_k^{(l)} x(kT + \tau_k - lT) \qquad (4)$$

where $c_k^{(l)}$ is the $l^{th}$ tap coefficient of FIR filter 301 at time k. The equalized output samples $y_k$ are then applied to MLSE detector 302 which detects the transmitted data symbols based on the 2-state VA algorithm employing the 2-state transition diagram of FIG. 2.

Depending on the (converged) sampling phase $\tau_k$, different impulse response coefficients $h_k$ characterize the "sampled channel." Therefore, since the sampled channel shows spectral variation as a function of sampling phase $\tau$, both equalization and timing recovery loops may be jointly adapted via a common error signal e. The error signal may be derived as known in the art based on a cost function, such as the mean squared error, and the error signal is derived as the stochastic gradient (or approximation thereof) of the cost function, such as the least means squares (LMS) error. Preferred embodiments of the present invention employ a LMS error term for the common error signal e.

Returning to FIG. 3, in a second path input sample $x_k$ at time k is applied to threshold detector 303 which generates a decision corresponding to the input sample $x_k$. During initialization (described subsequently), switch 320 is in position A to provide the decision of threshold detector 303 to response filter 301. During steady state operation, switch 320 is in position B to provide the decision of MLSE detector 302 to response filter 301. Either decision from switch 320 is applied to response filter 301 to generate an approximation to the data passing through a channel with the target response A+D. Combiner 305 generates the error signal ($e_k$) at time k as the difference between the output $y_k$ of (equalizer) SS-FIR filter 301 and the desired target response signal $z_k$ generated by response filter 304.

The common cost function employed is the quadratic error $e_k^2$, which is the highest variance unbiased estimate of the mean-squared error $E(e_k^2)$. As shown in Table 1, this cost function is minimized with respect to either sampling phase $\tau_k$ for timing recovery and FIR filter tap $c_k^{(l)}$ for equalization. Table 1 also gives the recursive update equation for each cost function. The recursive update equations are an approximation for updated sampling phase $\tau_k$ and FIR filter taps $c_k^{(l)}$.

TABLE 1

| Loop | Optimization Cost Function $e_k^2$ | Update Equation |
|---|---|---|
| Sampling Phase | $\dfrac{\partial e_k^2(\tau_k, c_k^{(l)})}{\partial \tau_k} = 0$ | $\tau_{k+1} = \tau_k - 2e_k(y_{k-1} - y_{k+1})$ |
| (LMS) Filter Taps ($\mu$ is a predetermined constant) | $\dfrac{\partial e_k^2(\tau_k, c_k^{(l)})}{\partial c_k^{(l)}} = 0$ | $c_{k+1}^{(l)} = c_k^{(l)} - \mu e_k x_k$ |

The constant $\mu$ controls the rate of adaptation, and for preferred embodiments the constant $\mu$ may be selected between $0 < \mu < (2/\lambda_{max})$, where $\lambda_{max}$ is the largest eigenvalue of the autocorrelation matrix of a filter-tap input vector. The error signal $e_k$ is multiplied by the constant $\mu$ and the current sample $x_k$ in multiplier 306 to generate the update signal $u_k$.

Figure 4:
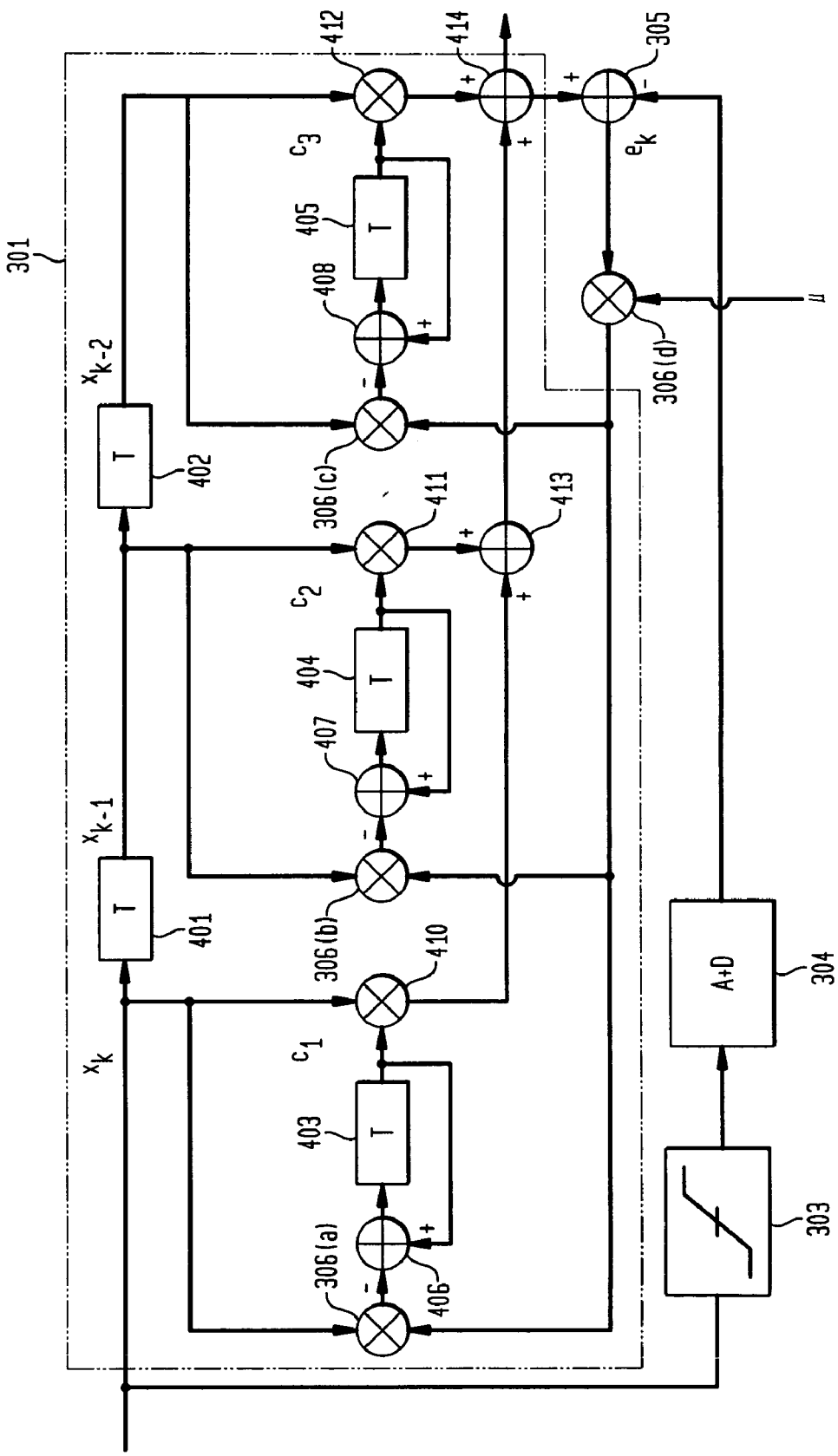
FIG. 4 shows a block diagram of the finite impulse response (FIR) filter of FIG. 3.

FIG. 4 shows a block diagram of an implementation of SS-FIR filter 301 of FIG. 3 using a 3-tap adaptive FIR filter. One skilled in the art would realize that the present invention is not limited to 3 taps, and that a given implementation of SS-FIR filter 301 may include more or less taps. The 3-tap FIR filter employs LMS adaptation with recursive updates as given in Table 1 when operating as an equalizer. SS-FIR filter 301 comprises delays 401 and 402 generating $x_{k-1}$ and $x_{k-2}$ from $x_k$, respectively. Multiplier 306 of FIG. 3 is implemented by four multipliers 306(a)–306(d). Multiplier 306(d) combines the error $e_k$ with the constant $\mu$, and multipliers 306(a)–306(c) multiply $x_k$, $x_{k-1}$, and $x_{k-2}$, respectively, with $\mu e_k$.

Delay 403 and combiner 406 operate to update the FIR filter tap $c_k^{(1)}$ with the output of multiplier 306(a) with recursive update of Table 1. FIR filter tap $c_{k-1}^{(2)}$ is similarly updated by delay 404 and combiner 407, and FIR filter tap $c_{k-2}^{(3)}$ is similarly updated by delay 405 and combiner 408. FIR filter tap $c_k^{(1)}$ and current sample $x_k$ are multiplied in multiplier 410, FIR filter tap $c_{k-1}^{(2)}$ and previous sample $x_{k-1}$ are multiplied in multiplier 411, and FIR filter tap $c_{k-2}^{(3)}$ and sample $x_{k-2}$ are multiplied in multiplier 412. The output values of multipliers 410, 411, and 412 are added together in combiners 413 and 414 to generate the current filtered sample $y_k$.

Since the sampled channel is spectrally close to the target response, the equalizer's noise enhancement and tap length N may be reduced. For the preferred embodiment, the precision (tap width) for filter tap values is 15 bits. The LMS adaptation takes place for every symbol (full baud rate) the rate for such recursive adaptation may be reduced by performing adaptation for sequential blocks of symbols (e.g. every 20 symbols). The adaptation rate may depend on the rate of channel variation.

Returning to FIG. 3, during start-up or other initialization, the parameter A may be initially set with an adaptation process as follows. Squared-error accumulator 307 generates the current mean squared error (MSE) by accumulating $e_k^2$ for each k. The current MSE is a quantity related to the channel quality. Parameter A may be defined with a discrete set of levels, such as the set A={0.2, 0.4, 0.6, 0.8, 1}. The current MSE value may then be employed to select a value for A from the discrete set of levels. The parameter A is adapted using an adjustment step of, for example, 0.2. Thus, the values for tap coefficients of FIR filter 301 are set to an initial value. Then the value of current MSE may be compared to an adaptation threshold, and while the value of current MSE is greater than the adaptation threshold, the parameter A is incremented by the adaptation step (when starting from a low initial value for A). When the current MSE is less than the adaptation threshold, the value for A is fixed, and taps of FIR filter 301 are then adapted. Alternatively, f starting from a high initial value for A, the adaptation process may decrement by steps until the current MSE is less than the adaptation threshold. During initialization, the branch metrics of the 2-state VA such as shown in FIG. 2 may also be updated, or may be fixed until the end of the initialization process, at which time the value of A for the 2-state VA is fixed.

During operation, some embodiments may also adaptively update the value of A during steady-state operation by monitoring the value of the current MSE. For this case, if the value of MSE becomes greater than the adaptation threshold, then the parameter A is incremented by the adaptation step until the current MSE is less than the adaptation threshold. To reduce A, the parameter A is periodically decremented by an adaptation step and the current MSE compared with the adaptation threshold. If the current MSE is greater than the adaptation threshold, the value for A is incremented by the adaptation step, but, if the current MSE remains less than the adaptation threshold, the value for A is decremented again by the adaptation step until the current MSE is greater than the adaptation threshold, at which point the parameter for A is incremented by the adaptation step and set. Again, the branch metrics of the 2-state VA such as shown in FIG. 2 may also be updated during this process.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for applying compensation to samples received from an optical channel comprising at least one optical fiber, the apparatus comprising:
   an equalizer having an equalizer response spectrally shaping the samples for compensation to generate a sequence of equalized samples;
   an error generator generating an error for a current sample based on the difference between 1) an equalized current sample and 2) a decision for the current sample adjusted for a target response, wherein the target response is based on a response of the at least one optical fiber; and
   a combiner configured to combine the error with one or more samples to provide an update signal, wherein the equalizer employs the update signal to adjust the equalizer response to the target response;
   a detector generating decoded data from the sequence of equalized samples using an algorithm; and
   an accumulator configured to accumulate the square of each error value, wherein the accumulation of the squared error values relates to a parameter of the target response, and the algorithm adjusts its transitions by adaptation of the parameter of the target response.

2. The invention of claim 1, wherein:
   the detector is a maximum likelihood sequence estimation (MLSE) detector; and
   the algorithm has transitions based on the target response.

3. An apparatus for applying compensation to samples received from an optical channel comprising at least one optical fiber, the apparatus comprising:
   an equalizer having an equalizer response spectrally shaping the samples for compensation to generate a sequence of equalized samples;
   an error generator generating an error for a current sample based on the difference between 1) an equalized current sample and 2) a decision for the current sample adjusted for a target response, wherein the target response is based on a response of the at least one optical fiber; and
   a combiner configured to combine the error with one or more samples to provide an update signal, wherein the equalizer employs the update signal to adjust the equalizer response to the target response;
   wherein the equalizer comprises a filter defined by a set of filter taps adapted in accordance with a recursive update rule, wherein the update rule is generated from a cost function.

4. The invention of claim 3, wherein the cost function is quadratic error and the update rule is generated from minimizing mean squared error of the cost function with respect to the filter tap.

5. An apparatus for applying compensation to samples received from an optical channel comprising at least one optical fiber, the apparatus comprising:
   an equalizer having an equalizer response spectrally shaping the samples for compensation to generate a sequence of equalized samples;
   an error generator generating an error for a current sample based on the difference between 1) an equalized current sample and 2) a decision for the current sample adjusted for a target response, wherein the target response is based on a response of the at least one optical fiber; and
   a combiner configured to combine the error with one or more samples to provide an update signal, wherein the equalizer employs the update signal to adjust the equalizer response to the target response;
   wherein the target response is of the form A+D, where A is a parameter ranging from about 0 to about 1, and D is a unit delay.

6. The invention of claim 5, wherein the equalizer comprises a filter defined by a set of filter taps.

7. An apparatus for applying compensation to samples received from an optical channel comprising at least one optical fiber, the apparatus comprising:
   an equalizer having an equalizer response spectrally shaping the samples for compensation to generate a sequence of equalized samples;
   an error generator generating an error for a current sample based on the difference between 1) an equalized current sample and 2) a decision for the current sample adjusted for a target response, wherein the target response is based on a response of the at least one optical fiber; and
   a combiner configured to combine the error with one or more samples to provide an update signal, wherein the equalizer employs the update signal to adjust the equalizer response to the target response; and
   an accumulator configured to accumulate the square of each error value, wherein the accumulation of the squared error values relates to a parameter of the target response, and the apparatus adapts the parameter of the target response during initialization of the apparatus.

8. A method of applying compensation to samples received from an optical channel comprising at least one optical fiber, the method comprising the steps of:
   (a) spectrally shaping, with an equalizer, the samples for compensation to generate a sequence of equalized samples;
   (b) generating an error for a current sample based on the difference between 1) an equalized current sample and 2) a decision for the current sample adjusted for a target response, wherein the target response is based on a response of the at least one optical fiber;
   (c) combining the error with one or more samples to provide an update signal;
   (d) updating the equalizer with the update signal to adjust the equalizer response to the target response;
   (e) generating decoded data from the sequence of equalized samples using an algorithm;
   (f) accumulating the square of each error value, wherein the accumulation of the squared error values relates to a parameter of the target response; and (g) adjusting the transitions of the algorithm by adaptation of the parameter of the target response.

9. The invention of claim 8, wherein:
step (e) generates decoded data with an algorithm having transitions based on the target response; and
step (e) generates decoded data with maximum likelihood sequence estimation (MLSE) detection.

10. A method of applying compensation to samples received from an optical channel comprising at least one optical fiber, the method comprising the steps of:
(a) spectrally shaping, with an equalizer, the samples for compensation to generate a sequence of equalized samples, wherein step (a) comprises the step (a1) of filtering based on a set of filter taps;
(b) generating an error for a current sample based on the difference between 1) an equalized current sample and 2) a decision for the current sample adjusted for a target response, wherein the target response is based on a response of the at least one optical fiber;
(c) combining the error with one or more samples to provide an update signal;
(d) updating the equalizer with the update signal to adjust the equalizer response to the target response; and
(e) adapting the set of filter taps in accordance with a recursive update rule based on a cost function.

11. The invention of claim 10, wherein the cost function is quadratic error and the update rule is generated from minimizing mean squared error of the cost function with respect to the filter tap.

12. A method of applying compensation to samples received from an optical channel comprising at least one optical fiber, the method comprising the steps of:
(a) spectrally shaping, with an equalizer, the samples for compensation to generate a sequence of equalized samples;
(b) generating an error for a current sample based on the difference between 1) an equalized current sample and 2) a decision for the current sample adjusted for a target response, wherein the target response is based on a response of the at least one optical fiber;
(c) combining the error with one or more samples to provide an update signal; and
(d) updating the equalizer with the update signal to adjust the equalizer response to the target response;
wherein, for step (b) the target response is of the form A+D, where A is a parameter ranging from about 0 to about 1, and D is a unit delay.

13. The invention of claim 12, wherein step (a) comprises the step (a1) of filtering based on a set of filter taps.

14. A method of applying compensation to samples received from an optical channel comprising at least one optical fiber, the method comprising the steps of:
(a) spectrally shaping, with an equalizer, the samples for compensation to generate a sequence of equalized samples;
(b) generating an error for a current sample based on the difference between 1) an equalized current sample and 2) a decision for the current sample adjusted for a target response, wherein the target response is based on a response of the at least one optical fiber;
(c) combining the error with one or more samples to provide an update signal;
(d) updating the equalizer with the update signal to adjust the equalizer response to the target response;
(e) accumulating the square of each error value, wherein the accumulation of the squared error values relates to a parameter of the target response; and
(f) adapting the parameter of the target response during initialization of the apparatus.

* * * * *